United States Patent [19]

Klopsch et al.

[11] 4,088,900

[45] May 9, 1978

[54] SAFETY CIRCUIT, ESPECIALLY FOR ELEVATORS AND THE LIKE

[75] Inventors: Herbert Klopsch; Klaus Lobert; Dietrich Stamm, all of Berlin, Germany

[73] Assignee: Inventio AG, Hergiswil NW, Switzerland

[21] Appl. No.: 687,752

[22] Filed: May 19, 1976

[30] Foreign Application Priority Data

May 21, 1975 Switzerland ........................ 6531/75

[51] Int. Cl.[2] ........................................ H02J 13/00

[52] U.S. Cl. ................................ 307/149; 307/202.1

[58] Field of Search .................... 307/202.1, 326–328, 307/149; 235/153 A; 340/146.1

[56] References Cited

U.S. PATENT DOCUMENTS 3,961,688 6/1976 Maynard .......................... 187/29 R

FOREIGN PATENT DOCUMENTS 1,055,782 4/1959 Germany .......................... 307/149

1,537,379 10/1970 Germany .......................... 307/149

*Primary Examiner*—Robert K. Schaefer

*Assistant Examiner*—Morris Ginsburg

*Attorney, Agent, or Firm*—Werner W. Kleeman

[57] ABSTRACT

A safety circuit arrangement, especially for transportation systems such as elevators, comprising at least one switching circuit equipped with two digital logical elements, each arranged in a separate information channel and connected at its input side with anti-valent signal generating information transmitters and at its output side with a monitoring circuit monitoring the anti-valence of the output signals. A control line for switching-off the installation in the presence of equivalence. A logical element of the monitoring circuit which is connected at its output side with the control line exclusively comprises diodes and input side logical elements of such monitoring circuit and the monitored digital logical elements are connected with a testing circuit which, upon placing into operation the elevator, applies a test signal simulating a defect in succession to both monitored digital logical elements. There is further provided a timing element having a switching-in time-delay connected in the control line for switching-off the elevator.

8 Claims, 2 Drawing Figures

SAFETY CIRCUIT, ESPECIALLY FOR ELEVATORS AND THE LIKE

BACKGROUND OF THE INVENTION

The present invention relates to a safety circuit, especially for transportation systems, such as elevators, comprising at least one switching circuit composed of two digital logical elements, each of which are arranged in a separate information channel and connected at the input side with information transmitters generating anti-valent signals and at the output side with a monitoring circuit in the form of an equivalent (INCLUSIVE-OR)- or anti-valent (EXCLUSIVE-OR) circuit for monitoring the anti-valence of the output signals.

The purpose of such type safety circuits, while taking into account the prevailing regulations, is to check whether there are present the prerequisites for placing into operation without danger the relevant system or installation which is to be protected and upon discovering errors which could lead to a dangerous operating condition preventing placement of the installation into operation.

In the construction of elevators or lifts for instance there exists the requirement that if an error together with a second error can lead to a dangerous operating condition, then at the latest during the next following condition changer during the course of the operation when the faulty functional element should come into play, the system or installation should be brought to standstill and there must be prevented an automatic restarting.

In this connection there is not taken into account that the second error also comes into play in leading to the dangerous operating condition before there is brought about standstill of the installation by the condition change.

In German patent publication No. 1,537,379 there is taught a safety circuit possessing logical components having two separate channels for the equivalent and their anti-valent switching variables. The one channel contains a NAND-element and the other a NOR-element as the logical elements. Further, at the input there are available anti-valent switching variables in the form of squarewave voltages with a predetermined repetition frequency and at the outputs of both logic elements there is connected a monitoring element which can be interrogated by test signals. As the monitoring element there is used an electronic switching amplifier, the supply voltage of which is tapped-off from the outputs of both logic elements. According to a further construction of the safety circuit the monitoring elements associated with the logic components form a series circuit wherein in each case the output of a monitoring element is connected with the input of the following monitoring element, and further, at the first monitoring element of the series circuit there is connected a test signal source and at the last monitoring element a group of components monitoring its output signals and comparing such with the test signals.

The drawback of this safety circuit resides especially in the fact that upon the occurrence of two errors in the logic components, for instance a respective error in both logic elements or a faulty logic element and a signal state of the inputs of the logic elements leading to equivalence of the output signals there can likewise be present anti-valence or anti-equivalence of the output signals. If both of the errors occur in timely succession, then, they can be detected by the test signals which follow one another as a function of time and emanating from the test signal source. However, if the errors occur simultaneously then it is not possible to detect the same by means of the monitoring element.

In German patent publication No. 1,055,782 there is taught a safety device for electrically operated elevators wherein there is used as the feeler or scanning device of a region which is to be protected, for instance within the door opening of an elevator cabin, one or a number of light barriers composed of light sources and photoelectric cells with appropriate relays. This apparatus is particularly characterized by the features that the control current circuit which switches-on the elevator drive is connected via a control device arranged in series with the motor protection switch, the control device comprising a series circuit consisting of the contact of a checking relay and the contacts of the photocell relay. The control device serves to control the feeler or scanning device in such a manner that it briefly shuts-off the light sources and only establishes the electrical connection to the motor protection switch when, upon shutting-off the light sources, the relays associated with the photocells are deenergized.

With this safety device for elevators there is thus checked the correct functioning of the switching element after releasing a travel command, before such is executed, by simulating an error preventing travel.

However, this safety device is associated with the drawback that upon defect of the testing or checking relay or the sticking of one of its contacts the feeler or scanning device no longer can be checked with respect to its functional reliability, so that the drawbacks associated with the light barriers, such as aging of the tubes, disturbances in the amplifiers, sticking of the relays and so forth, have an effect upon the operational reliability of the system. The simultaneous occurrence of two errors therefore leads to a dangerous operating condition which goes unnoticed by the safety circuit.

SUMMARY OF THE INVENTION

Hence, it is a primary object of the present invention to provide a new and improved construction of a safety circuit capable of recognizing two errors which are present or simultaneously occur at the point in time of triggering the testing or checking operation and which errors lead to a dangerous operating condition, and further, prevents their action from coming into play.

Another object of this invention aims at the provision of a new and improved construction of a safety circuit, especially for elevator installations which is extremely reliable in operation, not readily subject to malfunction or breakdown, and capable of positively detecting errors or faults leading to dangerous operating conditions.

Now in order to implement these and still further objects of the invention, which will become more readily apparent as the description proceeds, the safety circuit of this development is manifested by the features that the logic element of the monitoring circuit which is connected at the output side when there is present equivalence with a control line for shutting-off the installation exclusively consists of diodes and the input side logic elements of the monitoring circuit and the monitored logic elements are connected with a testing circuit which, upon placing into operation the installation or a part of the installation, applies in succession a test signal simulating an error to both monitored logic elements, and that a timing element with a switch-in time-delay is connected in the control line or conductor for the switching-off of the installation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
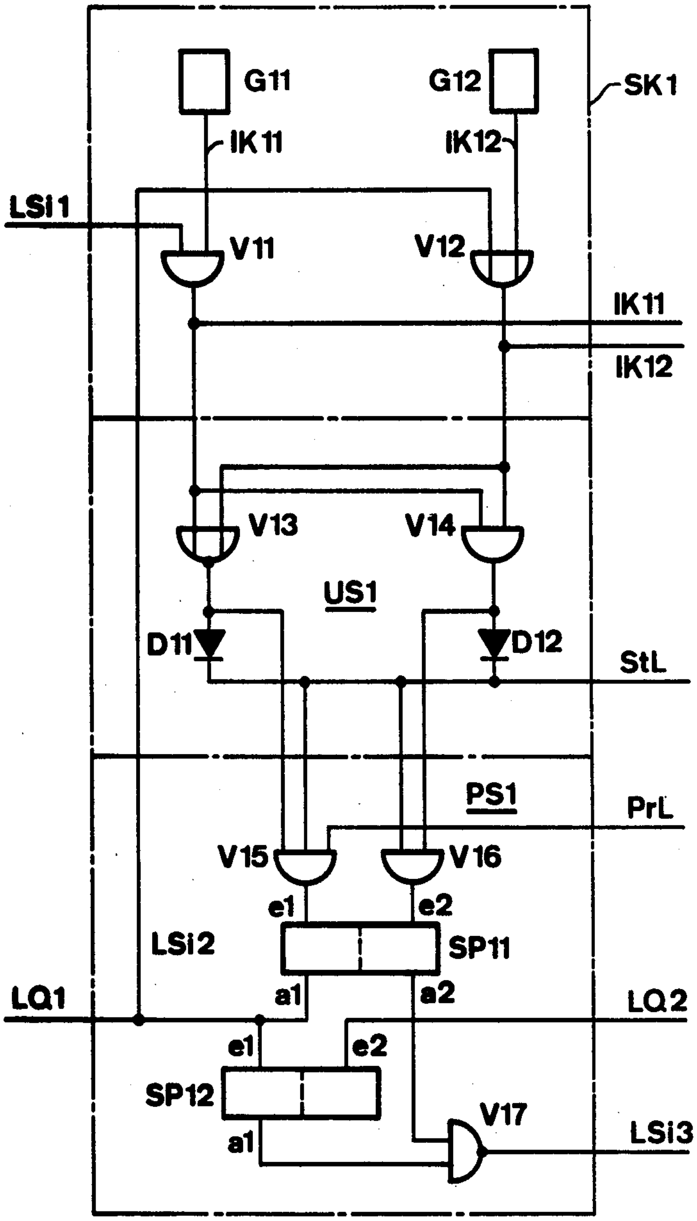
FIG. 1 is a schematic circuit diagram of a switching circuit of the safety circuit for an elevator system or installation.

Describing now the drawings, in FIG. 1 reference character SK1 designates a switching circuit of a safety circuit which contains two information transmitters G11 and G12 associated for instance with an elevator cabin door of a transportation system such as an elevator. The information transmitter G11 is connected via an information channel IK11 with an input of a digital logic element V11 possessing two inputs, for instance an AND-gate. On the other hand, the information transmitter G12 is connected through the agency of an information channel IK12 at an input of a digital logic element V12, for instance an OR-gate, and which logic element V12 possesses two inputs. At the outputs of the AND-gate V11 and the OR-gate V12 there is connected a monitoring circuit US1 which consists of a NOR-gate V13 and an AND-gate V14, each of which possess two inputs connected with the outputs of the AND and OR-gates V11, V12 respectively. The outputs of the NOR-gate V13 and the AND-gate V14 are connected via a respective diode D11 and D12 with a control line StL and a testing or checking circuit PS1. The testing circuit PS1 consists of an AND-gate V15 having three inputs and an AND-gate V16 having two inputs, a storage SP11 having two inputs and two outputs, a storage SP12 having two inputs and one output and a NAND-gate V17 having two inputs. The inputs of the AND-gate V15 are connected with the output of the NOR-gate V13, the control line or conductor StL and a testing line or conductor PrL and the inputs of the AND-gate V16 are connected with the output of the AND-gate V14 and the control line StL. The outputs of the AND-gates V15, V16 are connected with the inputs *e*1, *e*2 of the storage SP11, and its output *a*1 is connected with the input *e*1 of the storage SP12 and via a conductor or line LSi2 with an input of the OR-gate V12. The outputs *a*2 and *a*1 of the stores SP11 and SP12 respectively, are connected with both inputs of the NAND-gate V17.

Figure 2:
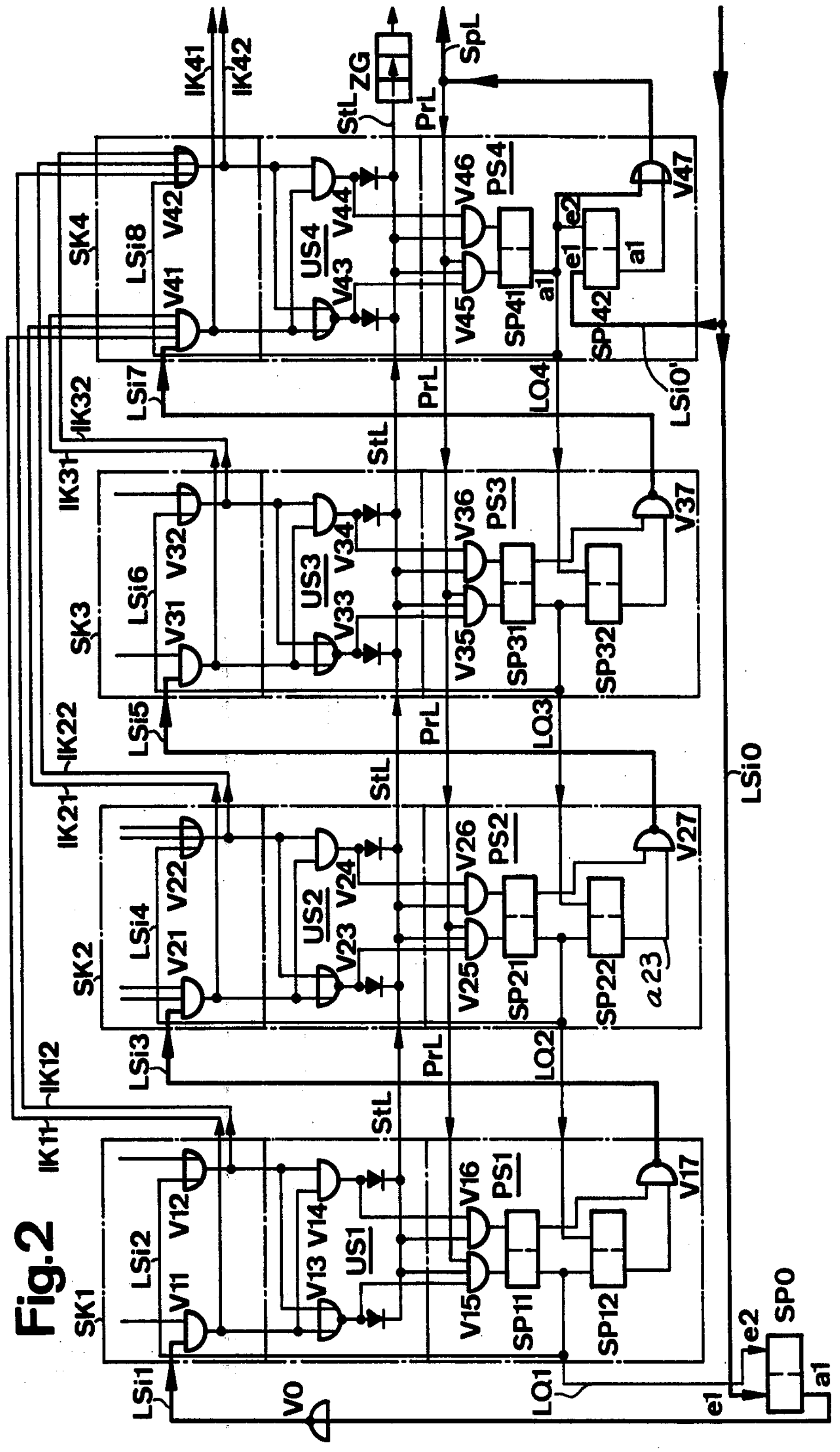
FIG. 2 is a circuit diagram of the safety circuit having a number of switching circuits.

In FIG. 2 reference characters SK1, US1, PS1, V11, V12, V13, V14, V15, V16, SP11, SP12, V17, D11, D12, IK11, IK12, LSi1, LSi2, LSi3, LQ1, LQ2, PrL and StL designate the same components as in FIG. 1. Reference characters SK2, SK3 and SK4 constitute switching circuits of the safety circuit which form a series circuit with the switching circuit SK1. Moreover, the monitoring circuits US1, US2, US3 and US4 of the switching circuits SK1, SK2, SK3 and SK4 as well as the testing circuits PS1, PS2 and PS3 of the switching circuits SK1, SK2 and SK3 are identical. The switching circuit SK2 is for instance operatively associated with the chute doors of an elevator installation, whereas the circuit SK3 carries out an optional, not particularly further described, monitoring function of the safety circuit of the elevator installation. In the switching circuit SK4 the data of the switching circuits SK1 to SK3 are assembled together into a resultant data. The switching circuits are connected in series in such a manner that in each instance the output of the corresponding NAND-gate V17, V27, V37 of a preceding switching circuit is connected via the associated conductor LSi3, LSi5, LSi7 respectively, with an input of the digital logic element V21, V31, V41 respectively, of the following switching circuit. The outputs a1 of the stores or storages SP21, SP31, SP41 of the switching circuits SK2, SK3, SK4 respectively, are connected via conductors LQ2, LQ3, LQ4 with the inputs *e*2 of the stores SP12, SP22, SP32 of the preceding switching circuits SK1, SK2, SK3 respectively.

A storage or store SP0 having two inputs and an output and arranged externally of the switching circuit is connected at the input *e*1 with a conductor or line LSi0 coupled with the control of the installation and at the input *e*2 via a conductor or line LQ1 with the output *a*1 of the storage SP11 (FIG. 1), whereas its output *a*1 is connected via a conductor or line LSi1 in which there is arranged a NOT-gate V0 with the second input of the digital logical element V11 (FIG. 1).

The input *e*1 of the storage SP42 of the testing circuit PS4 is connected via a conductor LSi0′ with the conductor LSi0 and its output *a*1 at an input of an OR-gate V47 possessing two inputs. The output of the OR-gate V47 is connected with the testing line PrL and a blocking line SpL which is connected with the control of the installation. The input *e*2 of the storage SP42 is connected with the output *a*1 of the storage SP41 and the second input of the OR-gate V47. A timing element ZG arranged externally of the switching circuit and having a switch-in time-delay is connected at the input side with the control line StL and at the output side with the control of the installation.

The information channels IK11/12, IK21/22 and IK31/32 of the switching circuits SK1, SK2 and SK3 are connected with the inputs of the digital logic elements of the switching circuit SK4, the outputs of which are connected on the one hand with the inputs of the monitoring circuit US4 and on the other hand via the information channels IK41/42 with the control of the installation.

The previously described safety circuit functions in the following manner:

During standstill of the elevator cabin and with the cabin doors closed the information transmitter G11 delivers a signal 1 to the AND-gate V11 and the information transmitter G12 delivers a signal 0 to the OR-gate V12. By means of the conductor or line LSi0 (FIG. 2) a signal 0 arrives at the input *e*1 of the storage SP0, the output a1 therefore likewise has the signal 0. The NOT-gate V0 arranged in the conductor or line LSi1 negates this signal, so that at the corresponding input of the AND-gate V11 there appears a signal 1, and hence its output also has appearing thereat the signal 1. Consequently, the outputs of the NOR-gate V13 and the AND-gate V15 exhibit the signal 0, so that the storage SP11 is not set and via the conductor LSi2 a signal 0 arrives at the corresponding input of the OR-gate V12, the output of which and therefore also the output of the AND-gate V14 exhibits the signal 0. The control line or conductor StL therefore carries a signal 0 defined as "installation not switched-off", whereas the information channels IK11/12 exhibit at the output of the elements V11/12 anti-valent or anti-equivalent signals. If this anti-valence is disturbed, then, the control line StL carries a signal 1 which switches-off the installation. However, if the disturbance is only of short duration, for instance a short coincidence of the information transmitter signals, then the timing element ZG prevents a switching-off of the installation.

The switching circuits SK2, SK3, SK4 function analogous to the switching circuit SK1, wherein in each instance the number of inputs of the digital logic elements V21/22, V31/32, V41/42 corresponds to the number of information to be processed. Further, via the conductors LSi3/4, LSi5/6, LSi7/8, analogous to the conductors LSi1/2 of the circuit SK1 leading to the elements V11/12 the signals 1 or 0 respectively, arrive at the corresponding inputs of the elements V21/22, V31/32, V41/42.

Since the inputs *e*1 of the storages SP41, SP42 exhibit the signal 0 there is present at their outputs *a*1 as well as at the output of the NOR-gate V47 likewise the signal 0. The testing line or conductor PrL and the blocking line SpL therefore carry a test signal 0 or a signal 0 defined as "unlocking the travel".

During faultless functioning of all of the switching circuits the information channels IK41/42, which signal the readiness to travel and lead to the control of the installation, likewise exhibit anti-valence or anti-equivalence of the signals.

Upon initiating travel of the elevator and shortly prior to closing of the doors a logic signal 1 is delivered to the conductor LSi0 by the control of the installation for the purpose of checking the safety circuit. This signal sets the storages SP42 and SP0. Thereafter there appears at the output of the OR-gate V47 a signal 1 which, during the duration of the testing operation, blocks the travel via the blocking line SpL and via the test line PrL is supplied into the switching circuits SK1 to SK4. At the output *a* 1 of the storage SP0 there likewise appears a signal 1 which arrives via the conductor LSi1 and the NOT-gate V0 as a logic signal 0 at the corresponding input of AND-gate V11. Consequently, the output of the AND-gate V11 and the NOR-gate V13 have appearing thereat the signals 0 and 1 respectively, and at all three inputs of the AND-gate V15 there is present the signal 1. The diode D12 thus prevents that there also will be present the signal 1 at both inputs of the AND-gate V16. Consequently, the storage SP11 is set, so that a signal 1 on the one hand resets the storage SP0 via the conductor or line LQ1 and, on the other hand, via the line LSi2 arrives at the corresponding input of the OR-gate V12. Thus, there is present at its output the logic signal 1 and since in the meantime due to resetting of the storage SP0 there is present at the output of the AND-gate V11 the signal 1 also the output of the AND-gate V14 has appearing thereat the signal 1. At both inputs of the AND-gate V16 there is thus likewise present the signal 1. This has the result that the storage SP11 is reset and there appears at its output *a*2 a signal 1, and the diode D11 prevents that it will again be reset. Since at the output *a*1 of the storage SP12 there is likewise present the logic singal 1, there thus is brought about a change of the signal 1 which is present at the output of the NAND-gate V17 into the signal 0. This signal 0 is transmitted via the conductor or line LSi3 to the switching circuit SK2 in which there now take place the same operations as in the switching circuit SK1.

After setting the storage SP41 in the switching circuit SK4 there is reset the storage SP42 and by means of the line LQ4 the storage SP32 of the switching circuit SK3. At the same time the signals 1 and 0 present at both of the inputs of the OR-gate V47 are altered into the logic signals 0 and 1 respectively, so that the conductors or lines PrL and SpL again carry the signal 1. First after resetting the storage SP41 does there appear the logic signal 0 at the output of the OR-gate V47, so that the testing operation is terminated and the blocking of the travel of the elevator is released.

Upon occurrence of defects the safety circuit functions in the following manner:

It is assumed that both digital logic elements V11, V12 of the switching circuit SK1 are defective at the moment of starting the travel of the elevator, the defects can arise in succession or at the same time. The inputs of the elements V11, V12 — which inputs are connected with the information transmitters G11, G12 — carry for instance the logic signals 0 and 1 respectively. By means of the conductors LSi1 a test signal 0 arrives at the second input of the AND-gate V11, so that its output likewise carries the signal 0. The assumed defect might be of the type that the output however exhibits the signal 1. Since the second input of the OR-gate V12 possesses the signal 0, its output carries the logic signal "1"; due to the here assumed defect however appears as logic signal "0". At the output of the NOR-gate V13 there is thus present a signal 0, and the storage SP11 cannot be set and through the agency of the conductor LSi2 no signal 1 can reach the OR-gate V12. Since the output of the AND-gate V14 and the output *a*2 of the storage SP11 each possess a signal 0, there does no occur at the output of the NAND-gate V17 any change in the signal state, so that via the conductor LSi3 no test signal can be delivered to the switching circuit SK2. Consequently, also no test signal arrives via the conductor LSi7 at the switching circuit SK4, so that the storages SP41, SP42 are not reset and the conductor SpL further carries the signal 1 bringing about blocking of travel.

Further, it may be assumed that the diode D12 of the switching circuit SK1 is defective, and the defect is of the type that current can neither flow in the forward direction nor in the reverse or blocking direction. Now if the inputs of the elements V13, V14 during the course of the testing operation exhibit the signals 1, then there appears at the output of the NOR-gate V13 the signal 0 and at the output of the AND-gate V14 the signal 1. At both inputs of the AND-gate V16 there are thus present the signals 0 and 1, so that its output carries the signal 0. Consequently, the storage SP11 cannot be reset, and at the output of the NAND-gate V17 there does not occur any signal change. The test signal is therefore not further transmitted, so that the conductor SpL continues to carry the logic signal 1 bringing about blocking of travel.

As a further example it is assumed that both of the digital logic elements V23, V24 of the monitoring circuit US2 of the switching circuit SK2 are defective at the point in time when there is initiated the travel, and the defects may be of the type occurring in succession or at the same time. The inputs of the elements V21, V22 which are connected with the not particularly illustrated information transmitters of the chute doors, with the chute doors closed, carry the signals 1 and 0 respectively. Now after checking the switching circuit SK1 which does not exhibit any defect and is associated with the elevator cabin doors a test signal 0 arrives via the conductor or line LSi3 at the relevant input of the AND-gate V21, with the result that its output carries the signal 0. Since by means of the conductor or line LSi4 no test pulse has yet arrived at the relevant input of the OR-gate V22 its output also carries the logic signal 0. Consequently, there appears at the output of the NOR-gate V23 the logic signal "1" and at the output of the AND-gate V24 the logic signal "0". The assumed defect may be of the type wherein the complementary signals appear at the outputs. Consequently, the storages SP21 and SP22 connected via the AND-gate V25 cannot be set and the input of the NAND-gate V27 which is connected with the output *a*23 of the storage SP22 again possesses the logic signal 0. At its input there thus does not appear any signal change, so that the test signal is not further transmitted. Consequently, the storages SP41, SP42 of the switching circuit SK4 cannot be reset, so that the conductor or line SpL continues to carry the signal 1 bringing about blocking of elevator travel.

The invention is not limited to the illustrated exemplary embodiment, rather also encompasses possible variant constructions. Thus, for instance, for both of the digital input-logic elements V11, V12 there can be used instead of an AND-gate and an OR-gate a NOR-gate and an AND-gate and for both of the logic elements V13, V14 of the monitoring circuit US1 there can be employed instead of a NOR-gate and an AND-gate an OR-gate and a NAND-gate. Also, for instance, the entire circuitry can be designed in NOR-technique or MOS-logic with self-blocking MOSFETS. Finally, the proposed safety circuit is not only usable in conjunction with elevator system or installations, rather also for other transportation systems or installations which should have a fail safe system built-in, such as for instance in railroads.

While there are shown and described present preferred embodiments of the invention, it is to be distinctly understood that the invention is not limited thereto, but may be otherwise variously embodied and practiced within the scope of the following claims.

What is claimed is:

1. A safety circuit arrangement, especially for a transportation installation such as an elevator, comprising at least one switching circuit equipped with two monitored digital logical elements each having an input side and an output side, each digital logical element being connected in circuit with a separate information channel, each digital logical element is connected at its input side with an associated anti-valent signal generating information transmitter and at its output side with a monitoring circuit for monitoring the anti-valence of the output signals, a control line for switching-off the installation in the presence of equivalence, said monitoring circuit comprising a logical element connected at its ouput side with the control line, said logical element solely comprising diode means, said monitoring circuit further comprising logical elements arranged at the input side of the monitoring circuit, a testing circuit, said input side-logical elements and the monitored digital logical elements being connected in circuit with said testing circuit, said testing circuit including means which, upon placing into operation the installation, applying a test signal simulating a defect in succession to both monitored digital logical elements, and a timing element having a switching-in time-delay connected in the control line for switching-off the installation.

2. The arrangement as defined in claim 1, wherein the monitoring circuit comprises an INCLUSIVE-OR circuit.

3. The arrangement as defined in claim 1, wherein the monitoring circuit comprises an EXCLUSIVE-OR circuit.

4. The arrangement as defined in claim 1, wherein both monitored logical elements comprise an AND-gate and an OR-gate, and both input side-logical elements of the monitoring circuit comprise a NOR-gate and an AND-gate.

5. The arrangement as defined in claim 4, wherein the information channels define first and second information channels, the testing circuit comprises a first AND-gate having three inputs and a second AND-gate having two inputs, a first storage having two inputs and two outputs, a second storage having two inputs and one output, and a digital logical member having two inputs, the inputs of the first AND-gate being connected with the output of the NOR-gate of the monitoring circuit, a test line, the control line and said test line carrying a logical signal "1" blocking the travel during the test operation, the inputs of the second AND-gate are connected with the output of the AND-gate of the monitoring circuit and with the control line and the outputs of said first and second ANd-gates are connected with the inputs of the first storage, the first storage having an output connected with an input of the second storage and via a conductor with an input of the monitored digitial logical element located in said second information channel, and the other output of said first storage is connected with one input of said digital logical member, and the output of the second storage is connected with the other input of the digital logical member.

6. The arrangement as defined in claim 5, including a further storage which can be set by the logical signal "1" supplied by a first conductor upon placing into operation the installation to be safeguarded, said further storage having two inputs and an output and being arranged externally of the switching circuit, and conductor means connected with the output of said further storage for carrying the logic signal "0" occurring upon setting of said further storage, said conductor means being connected with an input of the monitored digital logical element located in the first information channel, and a conductor connected at the output of the first storage and conducting the logic signal "1" occurring during setting of the first storage by means of the logic signal "0" supplied via the first conductor and connected with an input of the further storage for resetting thereof, and by means of the logic signal "1" the second storage can be set, a conductor leading from said output of the first storage to said monitored digital logical element located in said second information channel for resetting the first storage, and at the output of the digital logical member there can be obtained a signal change.

7. The arrangement as defined in claim 6, including a number of said switching circuits arranged in series, the output of the digital logical member of a switching circuit is connected via a conductor with an input of a digital logical element of the next following switching circuit, and an output of each first storage is connected via a conductor with an input of each second storage of the preceding switching circuit for the purpose of resetting thereof.

8. The arrangement as defined in claim 7, further including a blocking line, one input of the second storage of the testing circuit of the last switching circuit of said number of series connected switching circuits is coupled via a conductor carrying the logic signal "1" for setting said second storage when placing the installation into operation with said first conductor and its output is coupled at one input of an OR-gate defining the digital logical member of said last switching circuit and having two inputs, the output of the OR-gate carrying the logic signal "1" blocking the travel during the duration of the testing operation and being coupled with the test line and said blocking line, and an output of the first storage of the testing circuit is connected with the other input of the second storage and with the other input of the OR-gate, and upon passage of the logic signal "1" generated at the output of the first storage and resetting of both storages there is present at the output of the OR-gate a logic signal "0" which releases the blocking of the installation and brings about the termination of the testing operation.

* * * * *